US 9,201,749 B2

(12) United States Patent
Williams et al.

(10) Patent No.: US 9,201,749 B2
(45) Date of Patent: *Dec. 1, 2015

(54) DIAGNOSING CODE USING SINGLE STEP EXECUTION

(71) Applicant: ARM Limited, Cambridge (GB)

(72) Inventors: Michael John Williams, Ely (GB); Richard Roy Grisenthwaite, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,038

(22) Filed: Jul. 31, 2014

(65) Prior Publication Data

US 2014/0344621 A1    Nov. 20, 2014

Related U.S. Application Data

(63) Continuation of application No. 13/372,829, filed on Feb. 14, 2012, now Pat. No. 8,839,038.

(30) Foreign Application Priority Data

Mar. 14, 2011    (GB) .................................. 1104254.6

(51) Int. Cl.
*G06F 11/00*    (2006.01)
*G06F 11/22*    (2006.01)
*G06F 11/36*    (2006.01)

(52) U.S. Cl.
CPC ........ *G06F 11/2236* (2013.01); *G06F 11/3632* (2013.01)

(58) Field of Classification Search
CPC .............. G06F 11/2236; G06F 11/362; G06F 11/3632; G06F 11/3636; G06F 11/3648; G06F 11/3668

USPC ................................................ 714/25, 34, 35
See application file for complete search history.

(56) References Cited

U.S. PATENT DOCUMENTS

| 4,819,234 A | 4/1989 | Huber |
| 5,050,168 A | 9/1991 | Paterson |

(Continued)

FOREIGN PATENT DOCUMENTS

| GB | 2 380 831 | 4/2003 |
| JP | 2008-097602 | 4/2008 |

(Continued)

OTHER PUBLICATIONS

UK Search Report for GB1104254.6, dated Jun. 28, 2011, 1 page.

(Continued)

*Primary Examiner* — Marc Duncan
(74) *Attorney, Agent, or Firm* — Nixon & Vanderhye, P.C.

(57) ABSTRACT

A method and apparatus for controlling a processor to execute in a single step mode such that a single instruction from the instruction stream is executed, the processor determines if the single instruction is one of at least one predetermined type of instruction and stores a type indicator in a data storage location and a diagnostic exception is taken after the processor has processed the single instruction. Additionally, a diagnostic operation is performed including accessing the type indicator stored in the data storage location and, when the single instruction was not one of the predetermined type, controlling the processor to continue executing instructions in the single step mode, and, when the single instruction was one of the at least one predetermined type, controlling the processor to exit the single step mode and not execute the next instruction within the instruction stream as a single instruction followed by an exception.

28 Claims, 12 Drawing Sheets

(56) References Cited

U.S. PATENT DOCUMENTS

| | | | |
|---|---|---|---|
| 5,621,886 | A | 4/1997 | Alpert |
| 5,790,843 | A | 8/1998 | Borkenhagen et al. |
| 5,938,778 | A | 8/1999 | John et al. |
| 7,277,998 | B1 | 10/2007 | Agesen et al. |
| 7,350,110 | B2 | 3/2008 | DeWitt et al. |
| 8,429,622 | B2 | 4/2013 | Nanjundaswamy |
| 2003/0135787 | A1 | 7/2003 | DeWitt, Jr. et al. |
| 2004/0010789 | A1 | 1/2004 | Yamazaki et al. |
| 2004/0073780 | A1 | 4/2004 | Roth et al. |
| 2004/0123084 | A1 | 6/2004 | DeWitt et al. |
| 2005/0240819 | A1 | 10/2005 | Bennett et al. |
| 2006/0294326 | A1 | 12/2006 | Jacobson et al. |
| 2007/0168729 | A1 | 7/2007 | Chan |
| 2007/0180536 | A1 | 8/2007 | Kanai |
| 2008/0184055 | A1 | 7/2008 | Moyer et al. |
| 2009/0007119 | A1 | 1/2009 | Blumrich et al. |
| 2009/0183142 | A1 | 7/2009 | Hoban et al. |
| 2010/0100770 | A1 | 4/2010 | Mejdrich et al. |
| 2011/0022896 | A1 | 1/2011 | Drepper |
| 2012/0102469 | A1 | 4/2012 | Kapoor et al. |
| 2012/0210103 | A1* | 8/2012 | Liao et al. .................... 712/227 |
| 2012/0291017 | A1 | 11/2012 | Fuhrer et al. |

FOREIGN PATENT DOCUMENTS

| | | |
|---|---|---|
| TW | 200401187 | 1/2004 |
| TW | 200722987 | 6/2007 |
| WO | WO 02/48887 | 6/2002 |

OTHER PUBLICATIONS

International Search Report and Written Opinion of the International Searching Authority dated May 3, 2012 in PCT/GB2012/050232, 12 pages.

B. Glamm et al, "Automatic Verification of Instruction Set Simulation Using Synchronized State Comparison" IEEE, Simulation Symposium, Apr. 2001, pp. 72-77.

J. Rosenberg, "How Debuggers Work" Jan. 1996, pp. 119-123.

International Preliminary Report on Patentability mailed Sep. 26, 2013 in PCT/GB2012/050232, 7 pages.

European Office Action issued May 13, 2015 in EP 12 704 111.9, 5 pages.

First Office Action received in corresponding Chinese Appin. No. 201280013329.0 with Search Report and translation issued Jul. 9, 2015.

Office Action in corresponding Japanese Patent Appln. No. 2013-558495 dated Jul. 10, 2015—translated.

Office Action in Taiwan Appln. No. 101105114 dated Oct. 1, 2015 (with English Translation of Search Report).

\* cited by examiner

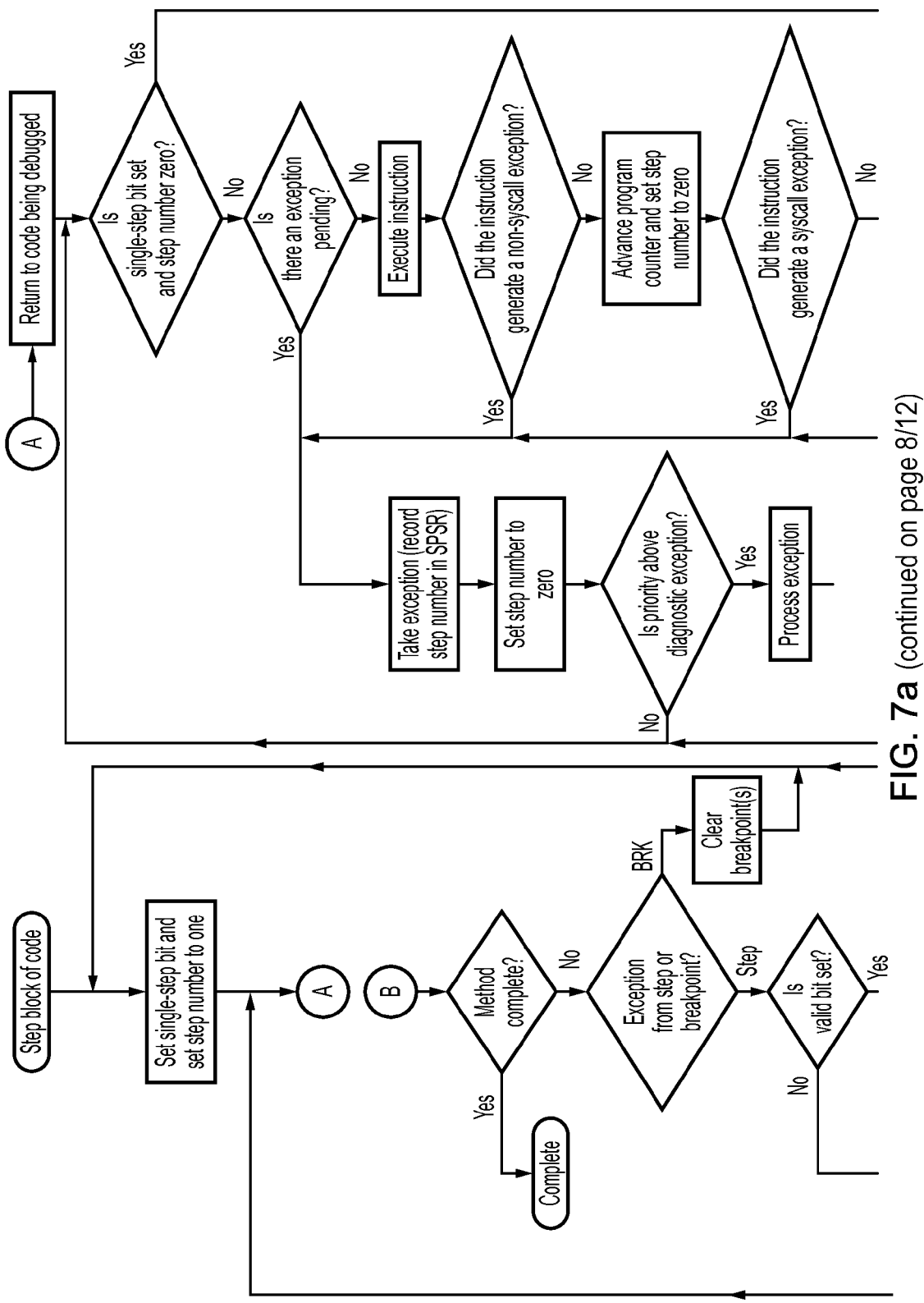
FIG. 7a (continued on page 8/12)

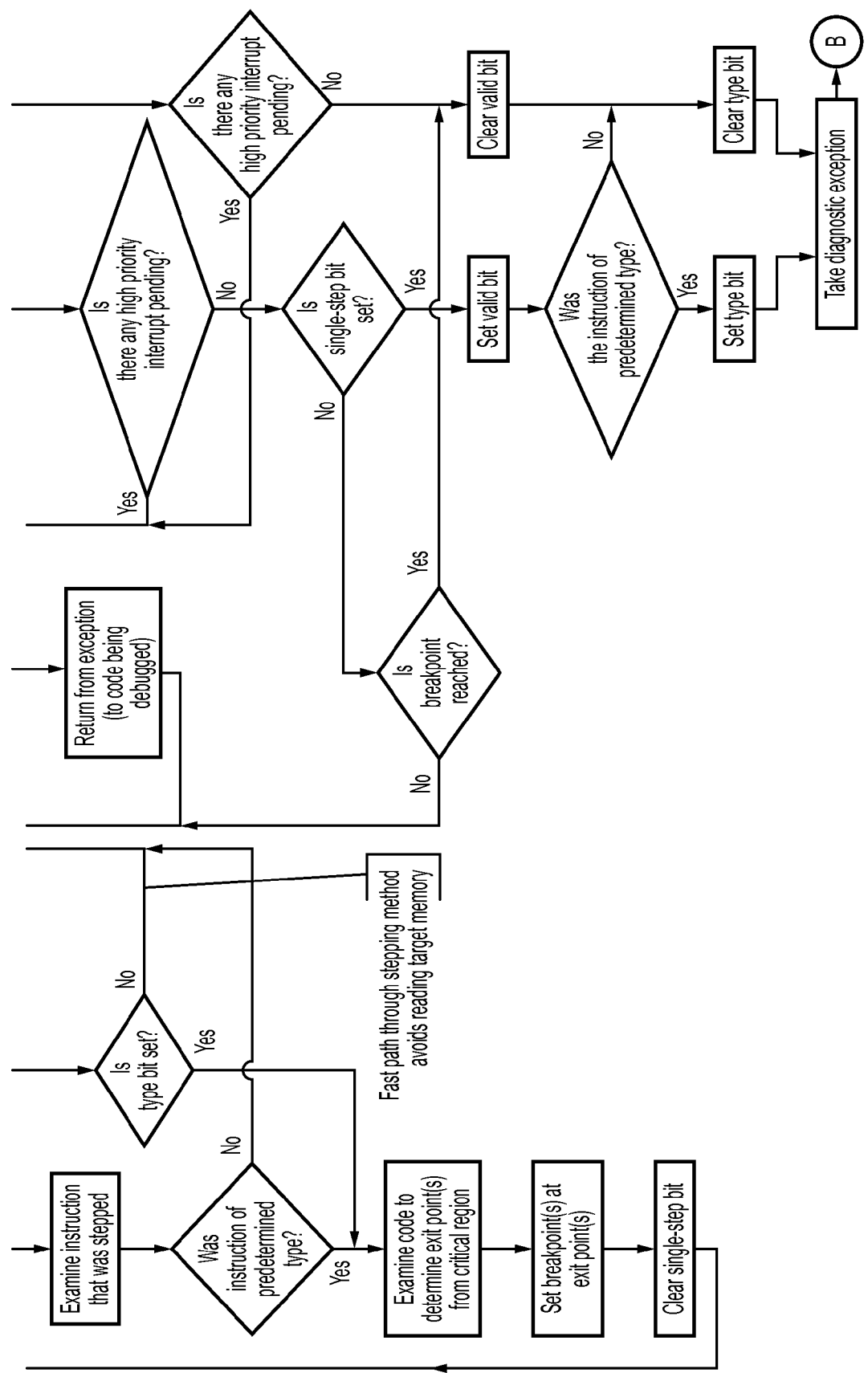
FIG. 7a (continued from page 7/12)

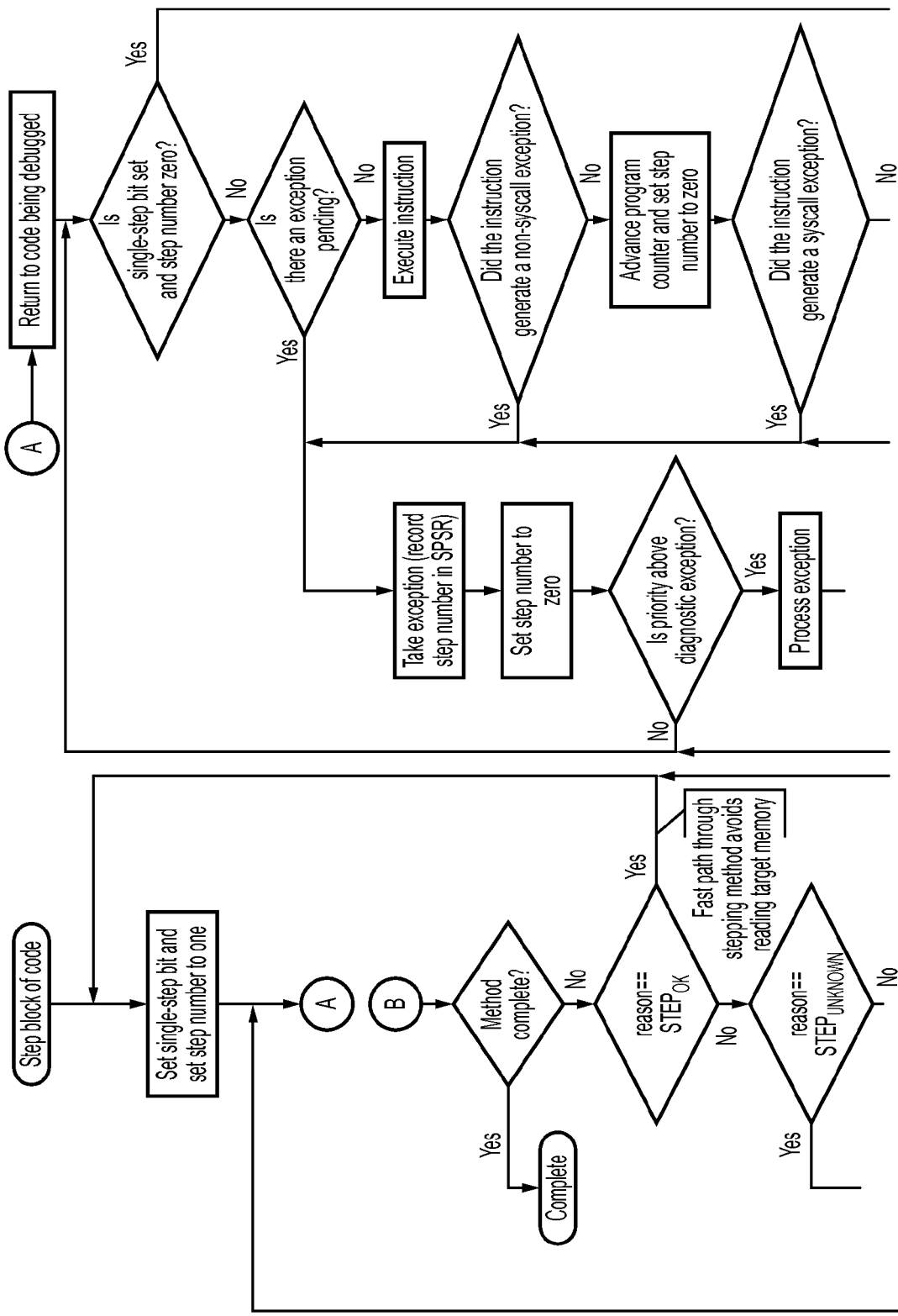
FIG. 7b (continued on page 10/12)

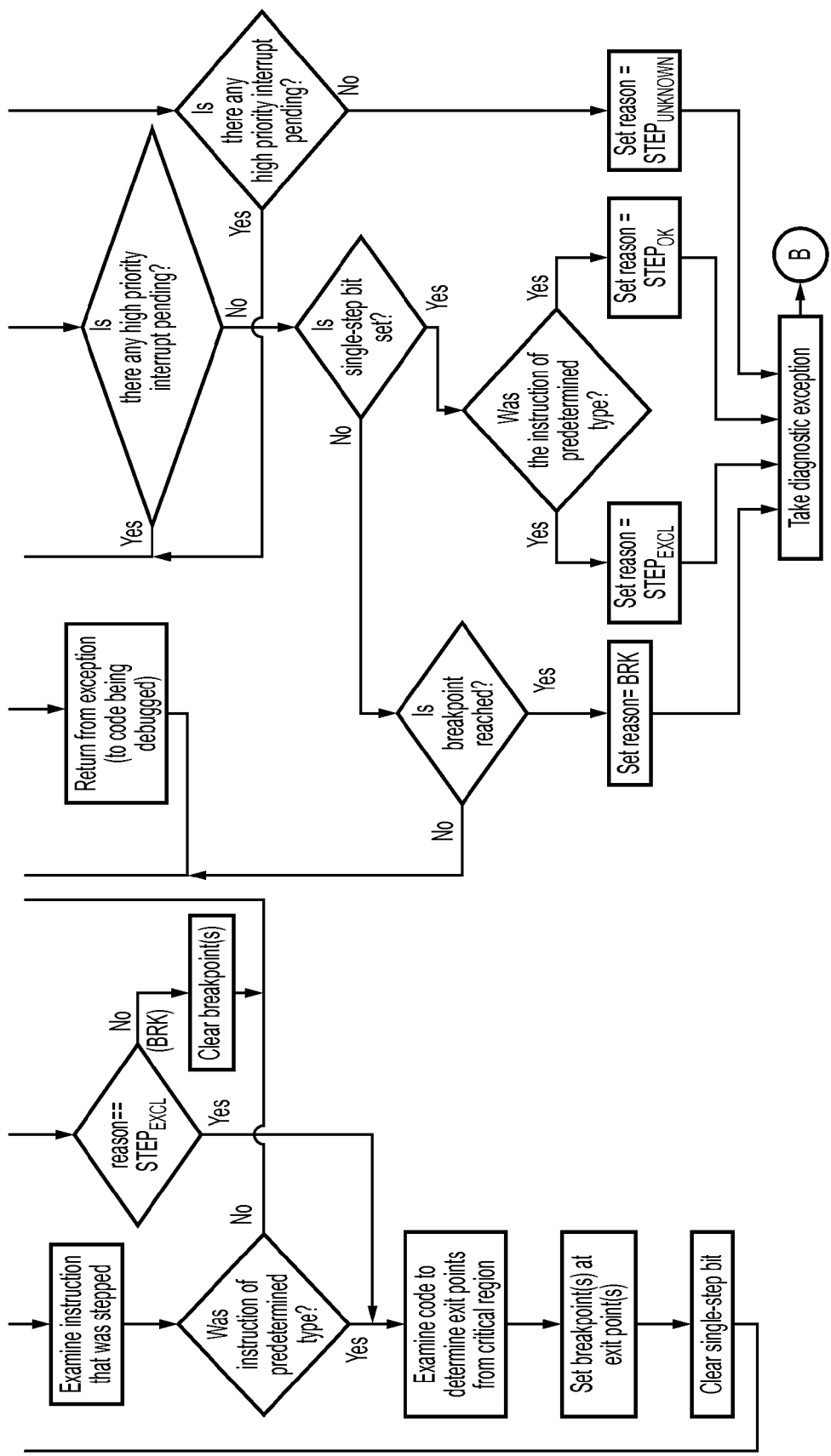
FIG. 7b (continued from page 9/12)

| MOE | Mnemonic | Debug state entry caused by |
|---|---|---|
| 0b0001 | BRK | Breakpoint |
| 0b0100 | HALT | External debug request |
| 0b0110 | STEP$_{OK}$ | Halting step, normal [not predetermined type] |
| 0b0111 | STEP$_{EXCL}$ | Halting step, exclusive [predetermined type] |
| 0b1000 | OSUC | OS unlock catch |
| 0b1001 | RC | Reset catch |
| 0b1010 | WPT | Watchpoint |
| 0b1011 | HLT | HLT instruction |
| 0b1100 | TRAP | Software access to debug register |
| 0b1101 | EC | Exception catch |
| 0b1110 | STEP$_{UNKNOWN}$ | Halting step, no syndrome [unknown type] |

Meaning of EDSCR[MOE] bits, all other values are reserved

FIG. 7c

DIAGNOSING CODE USING SINGLE STEP EXECUTION

This application is a Continuation of U.S. patent application Ser. No. 13/372,829, filed Feb. 14, 2012, pending, which claims priority of GB Application No. 1104254.6 filed Mar. 14, 2011, the entire contents of which are hereby incorporated by reference in this application.

BACKGROUND OF THE INVENTION

1. Field of the Invention

The field of the invention relates to data processing and in particular to performing diagnostic operations on data processing apparatus.

2. Description of the Prior Art

It is known to provide data processing systems with diagnostic mechanisms which can be used to perform diagnostic operations (e.g. software and hardware fault identification and analysis (debug)) upon the data processing systems so as to assist in the development of hardware, operating systems, application programs, overall system designs and the like.

When analysing a data processing system, an external debugger may be used which comprises a debug program run on a host system that is connected to the target system to be analysed such that control signals specifying diagnostic operations to be performed on the system are passed from the host to the system.

External debuggers involve a debugger being connected to the target via an external port which is then used to program the debug hardware. The processor is configured such that debug events that are considered as diagnostic exceptions cause entry to a special debug state in which the data processing apparatus is interrogated and controlled by the external debugger.

Alternatively there may be a self-hosted debug system where debug monitor software is executed on the target being debugged. In such a case, the processor is configured such that debug events cause diagnostic exceptions that interrupt the software being debugged and pass control to the debug monitor software. A useful diagnostic tool is the ability to control a processor to single step through a program. This allows the state of the system to be analysed at each step of the procedure if required. In the single step mode the processor will execute an instruction and then a diagnostic exception will be taken and control will pass to debug software which can analyse the state of the processor. When a return from the diagnostic exception occurs then the processor will execute the next instruction whereupon a next diagnostic exception will be taken. In this way the debug software may control the processor to single step through a whole program or just through a portion that is of interest to the person analysing the system.

One problem that can arise when single stepping through code is if code is encountered that has a different execution path if an exception is taken between instructions. This can be particularly difficult if the different execution path involves an infinite loop. For example an instruction that tries to claim an exclusive monitor. If the code succeeds in claiming the exclusive monitor then it has exclusive access to a particular storage location and can store data there. Thus, in order to claim the exclusive monitor, a special load-exclusive instruction is used that both returns the current value of the storage location, and sets the exclusive monitor so as to indicate that the instruction stream currently being executed has exclusive access to particular storage locations. A store exclusive instruction can then be executed to store data to such a storage location. However, in the case of single stepping through code, once the exclusive monitor has been claimed by setting it, a diagnostic exception is taken and on return from this exception the exception handler will clear the exclusive monitor. This is because when an exception is taken the exception handler may not return to the code it was previously executing but will return to different code, and thus the exclusive monitor should be cleared as the next instruction stream to be executed should not have exclusive access to the storage location.

However, in single step having cleared the exclusive monitor then when the store exclusive instruction is reached it will fail which triggers return to the steps to claim the exclusive monitor, which will claim it and then have it cleared by the exception return and thus, in single step the store exclusive instruction will repeatedly fail and the program will never progress.

An example of code with this problem is given below

| Loop | | | |
|---|---|---|---|
| | LDREX | R5, [R1] | ; read lock (load-exclusive) |
| | CMP | R5, #0 | ; check if 0 |
| | STREXEQ | R5, R0, [R1] | ; attempt to store new value |
| | CMPEQ | R5, #0 | ; test if store succeeded |
| | BNE | Loop | ; retry if not |

The problem with an exception handler clearing the exclusive monitor or lock location on return from a diagnostic exception and causing an infinite loop in this code when in step mode is known and addressed in GDB for Power and MIPS architectures by scanning an instruction prior to stepping through it in order to determine the location of blocks such as these. Once they have been identified a step until command is used such that a breakpoint is set in this case after the store exclusive instruction and no exception is taken between the instructions in this block and the lock location is not cleared by the exception handler.

A disadvantage of this solution is that all code needs to be examined to identify the problem code. This has significant overhead, as the diagnostic system will need to go to the operating system that is controlling execution of the instruction stream and ask it to fetch the code in order to be able to analyse it. If the diagnostic apparatus is remote from the processing apparatus the overhead will be particularly high.

Power discloses the use of a syndrome register which stores information about the state of the processor when a step exception (called trace exception in the Power architecture) is taken to allow return to that state. One piece of information that it stores is an indicator indicating that a load exclusive instruction has been executed and that a location is locked prior to taking the exception. There is no information on how this value is used.

It would be desirable to be able to diagnose code using single step procedures even where there is code of a type whose execution path is changed by the taking of an exception between instructions.

SUMMARY OF THE INVENTION

A first aspect of the present invention provides a method for diagnosing a processor processing a stream of instructions comprising: (i) controlling said processor to execute in a single step mode such that a single instruction from said instruction stream is executed, said processor determines if said single instruction is one of at least one predetermined type of instruction and stores a type indicator in a data storage location and a diagnostic exception is taken after said processor has processed said single instruction; (ii) performing diagnostic operations following said diagnostic exception including: accessing said type indicator stored in said data storage location; and (iiia) in response to said type indicator indicating said single instruction was not one of said predetermined type controlling said processor to continue executing instructions in said single step mode such that a next single instruction is executed on return form said exception; (iiib) in response to said type indicator indicating said single instruction was one of said at least one predetermined type controlling said processor to exit said single step mode and not execute said next instruction within said instruction stream as a single instruction followed by a diagnostic exception.

The present invention recognises that problems can arise when single stepping through code and that it may be advantageous on some occasions to determine where single stepping is not appropriate and suppress the single stepping. For example, in the case where the stream of instructions contains instructions where the execution path taken by later instructions within the stream is changed by the taking of an exception between the instructions, single stepping will not be an appropriate way of analysing execution of that piece of code and should be suppressed. It also recognises that this can be a particular problem if the taking of an exception triggers the code to enter an interminable loop. It addresses the above problems by determining whether or not an instruction being executed is of a predetermined type and if it is, it does not continue with the single stepping but rather performs a different procedure. In many cases whether or not the instruction is of the predetermined type can be determined during execution and single stepping can be suppressed where appropriate.

In some embodiments said step (iiib) comprises controlling said processor to execute a plurality of instructions within said instruction stream on return from said exception.

In order to address the problem of exceptions between instructions changing the execution path, it may be appropriate to suppress the single step mode for a plurality of instructions such that they are all executed sequentially without exceptions occurring. The number of instructions that are executed sequentially can be selected depending on the code and single step mode can be returned to at a point in the instruction stream that is suitable for that code.

In some embodiments, said plurality of instructions comprises a plurality of instructions subsequent in said instruction stream to said executed single instruction.

The plurality of instructions that are executed on return from the exception may be instruction subsequent in the instruction stream to the executed single instruction. Alternatively, it may be that the instruction that was executed is executed again along with some following instructions. The latter is only possible if it determined that it is possible to re execute this instruction. In some cases this may not be possible. However, if it is possible, executing it again without the instruction then being followed by an exception may be advantageous.

In some embodiments, there is a further step of in response to said type indicator indicating said single instruction was one of said at least one predetermined type setting at least one breakpoint within said instruction stream, such that said plurality of instructions are executed until said at least one breakpoint is reached, and taking a diagnostic breakpoint exception in response to reaching said at least one breakpoint. When the predetermined type of instruction is detected then in some embodiments a breakpoint can be set at a point in the code following the predetermined type of instruction. Single step mode is then suspended and the instructions are executed until the breakpoint is reached, whereupon a breakpoint diagnostic exception is taken. In response to this the processor may return to single step mode if appropriate, alternatively, further breakpoints may be set or the end of the code being tested may have been reached.

In some embodiments, said step (iiib) comprises emulating said executed single instruction and at least one subsequent instruction in said instruction stream and then controlling said processor to commence said single step mode from an instruction in said instruction stream following said at least one subsequent instruction that was emulated.

In some embodiments rather than executing the instructions they might be emulated by the diagnostic apparatus for example and once these emulated instructions have been executed the processor can be controlled to recommence single step mode from an appropriate instruction in the instruction stream. The instructions that are emulated will be selected so that single step mode is recommenced from an instruction where the diagnostic exceptions taken between each instruction will not alter how the instruction stream proceeds.

In some embodiments, said type indicator stored in said data storage location indicates that said instruction was one of said predetermined type or said instruction was not one of said predetermined type or that said instruction is of an unknown type, wherein if in said step of accessing said type indicator it is determined that said type indicator indicates that said type is unknown an additional step of examining said single instruction and determining if said single instruction is of said predetermined type is performed.

Although the type indicator may indicate whether the instruction is of a predetermined type or not, it may also indicate when it is unknown whether it is of a predetermined type or not. In the latter case then the method examines the instruction to determine what type it is. This may require the instruction to be fetched such that it can be analysed. Although such a step has a latency overhead associated with it, it will only be in a small number of cases that the unknown type will be indicated and thus, this will not increase the overhead for performing the whole diagnostic method unduly.

In some embodiments, said type indicator comprises two indicator values, a first value indicating whether said instruction is of said predetermined type or not of said predetermined type and a second valid value indicating if said first value is valid, said second valid value being invalid indicating said instruction is of said unknown type.

The indication of type may be done using two values, or two bits, one indicating the type and the other being a valid bit, indicating when the type bit is invalid in other words, the type is unknown. This can be a convenient way of representing the values as when circumstances occur that mean the type value can no longer be relied on the valid bit can simply be set to invalid.

In other embodiments the indication of type may be a single value. This value may in some embodiments further comprise an indication of the type of diagnostic exception taken.

For example, it may indicate the reason for the diagnostic exception such as breakpoint taken or halt request.

In some embodiments, in response to said processor flushing state before taking of said next diagnostic exception said type indicator is set to indicate said executed instruction is of said unknown type.

If the state of the processor is flushed before taking a next diagnostic exception then the instruction type should be set to unknown, which in some embodiments can be done by setting the valid bit to invalid. The flushing of the state may occur in response to a flushing of a pipeline in a pipelined processor, perhaps in response to a flush instruction.

In some embodiments, said method comprises an initial step of setting a single instruction step control value indicating said single instruction step diagnostic method is to be performed and setting a step indicator value indicating a single instruction in said instruction stream is to be executed before a next diagnostic exception is to be taken.

The single step mode might be indicated by a stored control value such that when this control value is set the processor knows that it is operating in single step mode and that after each instruction is executed it should take a diagnostic exception. There may also be a step indicator value which is set to one value, for example one, to indicate one step is to be executed and when an instruction has been processed it is set to another value, for example zero, to indicate that no further instruction is to be executed before a next diagnostic exception is taken.

In some embodiments, in response to said step indicator value indicating zero instructions are to be executed before taking a next diagnostic exception, said type indicator is set to unknown type on taking said next diagnostic exception.

The step indicator value can be useful where an exception that is not a diagnostic exception has been taken during single step mode. In such a case, the value in the step indicator indicates whether on return from the exception an instruction should be executed or whether the diagnostic exception should be taken immediately. Furthermore, if it is set to indicate zero instructions to be executed then this indicates that an exception has been taken after the instruction has executed but before the subsequent diagnostic exception has been taken and in this case it is advantageous if the type of instruction is set to unknown as the taking of the exception may have changed the type indicator.

Although the predetermined type of instructions may be a number of things, in some embodiments one of said at least one predetermined type of instruction comprises a type of instruction where performing an exception following said instruction may cause at least one subsequent instruction in said instruction stream to execute differently. In particular, where said predetermined type comprises a type of instruction where operations performed by an exception handler on entry to or return from said diagnostic exception change a state of the apparatus comprising said processor such that subsequent instructions in said instruction stream may execute differently. Such instructions are not suitable for analysis in the single step mode.

Instructions where exceptions change a path of execution of the original instruction stream are not suitable for analysis in the single step mode and thus, a diagnostic method that can determine which these instructions are and then suppress single step mode is advantageous.

In some embodiments one of said at least one predetermined type of instruction comprises an instruction that accesses a lock location, said lock location storing one of a lock value and a clear value, said clear value indicating that a processor can write to a predetermined storage location and said lock value indicating exclusive write access to said predetermined storage location for a processor that stored said lock value.

When taking an exception during processing of an instruction stream, on return from that exception the processor may not resume execution at the point it was interrupted but may commence executing at a different point, for example it may commence executing instructions from a different application. Thus, if there is a lock location in which a stored lock value indicates that a predetermined storage location is locked and can only be written to by an exclusive store access to the predetermined address from that application, the lock value is cleared on return from the exception, as the return may not be to the same point in an application and the lock value will then not be appropriate for the next instructions that are executed. This causes problems in step mode where an exception occurs between each instruction and thus, it is advantageous if this type of instruction is one of the predetermined types that causes step mode to be exited.

A second aspect of the present invention provides a computer program product for storing a computer program which when executed by a data processing apparatus controls the data processing apparatus to perform steps in the method according to a first aspect of the present invention.

A third aspect of the present invention provides a diagnostic apparatus for analysing a processor processing a stream of instructions, said diagnostic apparatus comprising: an output for outputting control signals to said processor and an input for receiving data from said processor; and diagnostic circuitry for performing diagnostic operations; said diagnostic circuitry being configured to output a control signal to said processor to set an indicator value indicating said processor is to operate in single step mode such that a single instruction in an instruction stream is executed and then a diagnostic exception is taken; and said diagnostic circuitry being configured to access a storage location for storing a type indicator indicating whether said executed single instruction was one of at least one predetermined type of instruction; and in response to said type indicator indicating said executed single instruction was not one of said predetermined type said diagnostic circuitry is configured to control said processor to continue executing said instructions in said single step mode such that a next single instruction is executed on return form said exception; and in response to said type indicator indicating said executed single instruction was one of said at least one predetermined type said diagnostic circuitry is configured to control said processor to exit said single step mode and not execute said next instruction within said instruction stream as a single instruction followed by an exception.

A fourth aspect of the present invention provides a data processing apparatus comprising a processor for processing a stream of instructions and a diagnostic apparatus according to a third aspect of the present invention for analysing said processor.

A fifth aspect of the present invention a data processing apparatus comprising a processor for processing data and a plurality of storage locations for storing control data; at least one of storage locations storing a single step mode control value, said data processing apparatus being configured to respond to said single step mode control value being set to execute instructions from an instruction stream in a single step mode, such that a diagnostic exception is taken after execution of each of said instructions; said processor being configured when said single step mode control value is set to determine for each instruction executed by said processor whether it is of one of at least one predetermined type and to store a type indicator within one of said storage locations, said type indicator indicating that said instruction was one of said predetermined type, or said instruction was not one of said predetermined type or said instruction is of an unknown type.

When a data processing apparatus executes in a single step mode, instructions are executed one by one and after execution of every instruction in this mode a diagnostic exception is taken so that the state of the processing apparatus can be analysed. It should be noted that the diagnostic exception may not be taken immediately after execution of an instruction in that another exception may be received during execution of the instruction and this may be taken first. However on return from this exception then a diagnostic exception will be taken before the next instruction in the instruction stream is executed. In this aspect of the invention the processor determines for each single instruction executed whether it is of a predetermined type or not and stores a type indicator indicating if it is, if it is not, or if the type is unknown.

In some embodiments said type indicator store comprises a store for two values, a first value indicating if said type is of said predetermined type or not and a second value indicating if said first value is valid or not, said unknown type being represented by said second value indicating said first value is invalid.

A convenient way of storing the type information is using two values, the first value indicating the type and the second whether the first is valid or not, i.e. whether the type is known or unknown. As the values can each have one of two values, they could each be represented by a single bit.

In other embodiments the type information is a single value and in some embodiments further comprises an indication of a type of diagnostic exception taken. For example, it may indicate the reason for the diagnostic exception, thus, this might be that the diagnostic exception is due to: software step of an instruction of the predetermined type, software step of an instruction not of the predetermined type, or some other debug event such as a breakpoint being taken or a halt request.

In some embodiments, said data processing apparatus is configured in response to said processor flushing state before taking of said following diagnostic exception to set said type indicator to indicate said executed instruction is of said unknown type.

In general when executing an instruction the processor can determine whether it is of the predetermined type or not and can store this information. However, in certain circumstances the state of the processor will be flushed and this information will be lost. Thus, it is important in such a circumstance that the type indicator is set to unknown so that this is recognised. Flushes of state occur, for example, in response to an explicit flush instruction being executed or on the return from an exception.

In some embodiments, one of said storage locations is configured to store a step indicator value indicating either one or zero instructions are to be executed before taking a next diagnostic exception, said data processing apparatus being configured to set said type indicator to unknown type on taking a diagnostic exception in response to said step indicator value being zero.

The data processing apparatus is in some embodiments configured in response to an exception being taken after execution of one of said single instructions before said diagnostic exception is taken to set said step indicator value to zero such that on return from said exception no instructions are executed in response to said step indicator value being zero and a pending diagnostic exception is taken. At this point the type indicator should be set to unknown as other instructions may have been executed in response to the other exception and thus, this value may no longer reflect the previous single instruction that was executed in the step mode.

In some embodiments said predetermined type comprises a type of instruction where operations performed by an exception handler on entry to or return from said diagnostic exception change a state of said processing apparatus such that subsequent instructions in said instruction stream may execute differently.

A sixth aspect of the present invention provides a virtual machine provided by a computer program executing upon a data processing apparatus, said virtual machine providing an instruction execution environment according to the data processing apparatus of a fourth or a fifth aspect of the present invention.

The above, and other objects, features and advantages of this invention will be apparent from the following detailed description of illustrative embodiments which is to be read in connection with the accompanying drawings

BRIEF DESCRIPTION OF THE DRAWINGS

FIG. 7a shows a flow diagram illustrating steps in a method according to an embodiment of the present invention;

FIG. 7b shows a flow diagram illustrating steps in a method according to a further embodiment of the present invention;

FIG. 7c shows a table of possible values for indicators indicating reasons for a debug event along with type of instruction stepped.

DESCRIPTION OF PREFERRED EMBODIMENTS

Figure 1:
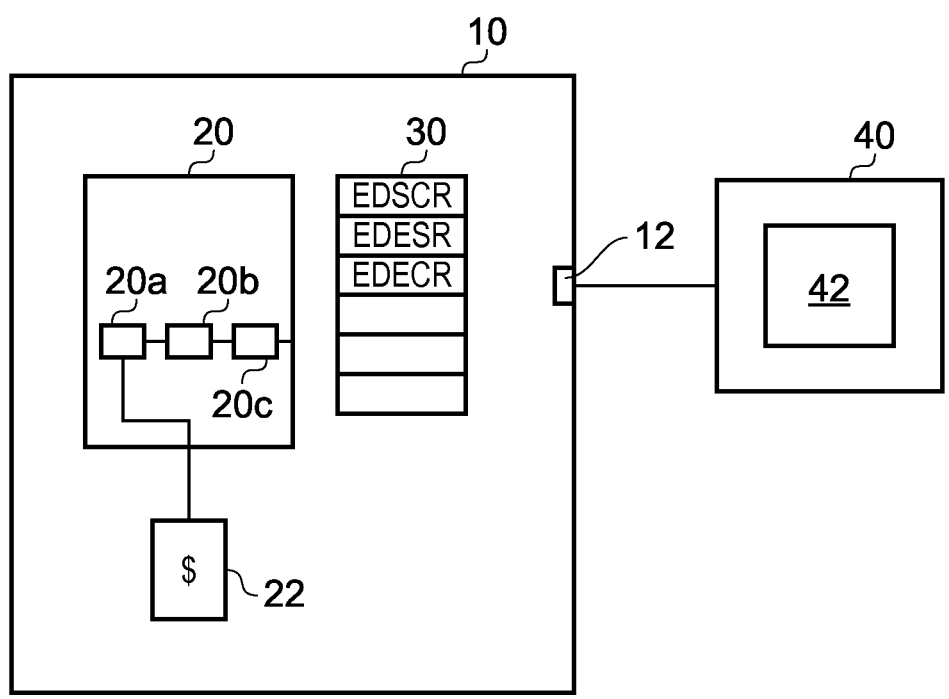
FIG. 1 shows a data processing apparatus with a remote diagnostic apparatus connected to it according to an embodiment of the present invention.

FIG. 1 shows the data processing apparatus 10 having a processor 20 for processing a stream of instructions. The processor comprises a pipeline having a fetch unit 20a for fetching instructions from an instruction cache 22, a decode unit 20b for decoding the instruction and an execution unit 20c for executing the decoded instructions. Data processing apparatus 10 also has a register bank 30 comprising registers for storing data used during processing. These include status registers that store a current state of the processor and at least one control register for storing control values. The status registers may be required where for example an interrupt is taken and the current state of the processor needs to be stored so that on return from the interrupt it can be restored.

Data processing apparatus 10 also has an external port 12 that connects with a diagnostic apparatus 40 which includes diagnostic circuitry 42. Diagnostic circuitry 42 is used to analyse the operation of the data processing apparatus and thus, can send signals to control the execution of the processor 20 and can receive data output from the processor for analysis.

In this embodiment, diagnostic circuitry 42 is configured to control processor 20 to operate in single step mode when it wishes to analyse the processor's execution of an instruction stream. In single step mode after execution of each instruction a diagnostic exception is taken before execution of the next instruction in the instruction stream. In this way the processor steps through a program and after each step the state of the processor can be analysed by the diagnostic circuitry 42. The diagnostic circuitry 42 controls the processor to operate in single step mode by setting a bit EDECR.SS in a control register EDECR, this bit being set indicating to the processor 20 that it should operate in single step mode. There is a further control register EDESR that has a bit EDESR.SS that is decremented when an instruction is executed and incremented by the taking of a diagnostic exception. This bit enables the processor to know if a non-diagnostic exception is taken during single step mode, whether an instruction should be executed or a diagnostic exception taken on return from the non-diagnostic exception. There is a further status register EDSCR, which has a bit field EDSCR.MOE which records the reason for taking the diagnostic exception.

When a diagnostic exception is taken diagnostic code is executed by diagnostic circuitry 42, which detects the state of the data processing apparatus 10 and stores some of this information for analysis.

When the diagnostic circuitry 42 wants to end the process it resets single step bits EDECR.SS and EDESR.SS in the control registers and the processor then reverts to normal execution mode.

In addition to controlling the processor to operate in a single step mode diagnostic circuitry 42 can also control other diagnostic operations to be performed. For example it can set breakpoints or watchpoints within the code being executed and these allow the code to be interrupted at certain set points in its execution and the state of the processor can then be analysed at these points.

Figure 2:
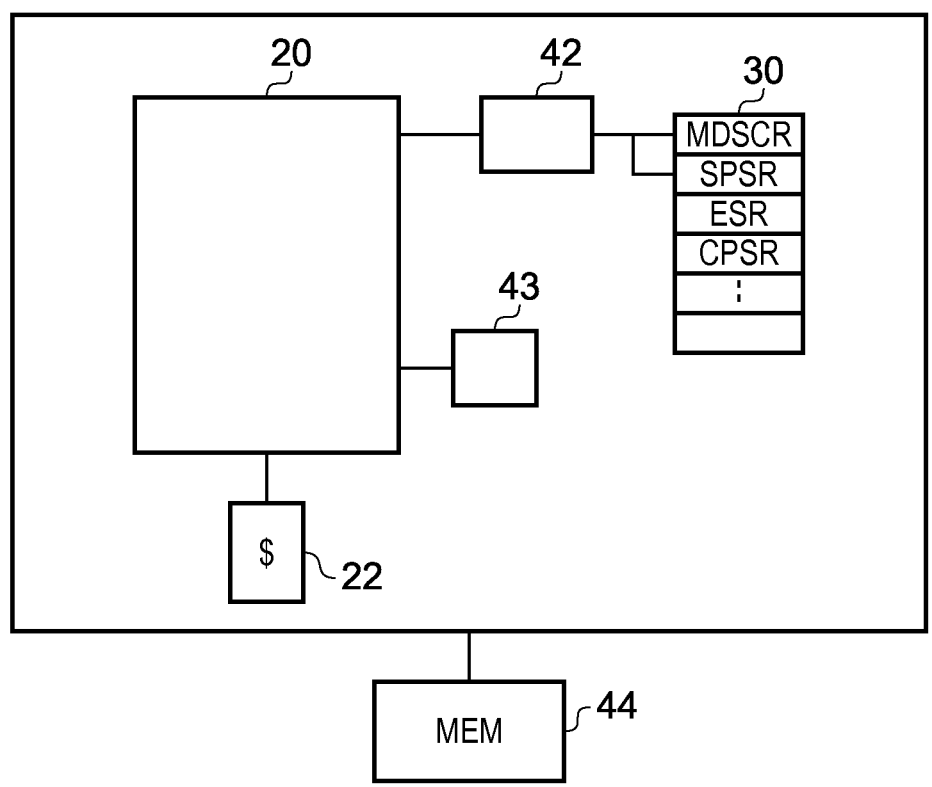
FIG. 2 shows a data processing apparatus which incorporates diagnostic circuitry according to an embodiment of the present invention.

Although in FIG. 1 the diagnostic circuitry 42 is shown as being external to the processing apparatus 10 in many embodiments such as in FIG. 2 it will be present inside the processing apparatus.

Thus, FIG. 2 shows a data processing apparatus 10 comprising diagnostic circuitry 42, register bank 30 and a data store for storing diagnostic software that can be executed in some embodiments by a processor within diagnostic circuitry 42, while in other embodiments on processor 20 itself. In some embodiments the diagnostic software may be stored in an external memory 44.

In the cases detailed above, taking of a diagnostic exception will trigger the diagnostic software stored in store 43 or memory 44 to be executed by processor 20. In this embodiment the values stored in register bank 30 are slightly different to those stored in the register bank of FIG. 1. In this embodiment, a user may indicate that single step diagnostic mode should be entered and the diagnostic circuitry 42 will write to the control registers in register bank 30 and set the single step bit MDSCR.SS in the MDSCR register which indicates the signal step mode and the saved step number bit SPSR.SS in the saved status register SPSR which indicates the number of steps to be taken to either 1 or 0. The diagnostic circuitry 42 then instructs the processor 20 to execute the software being debugged. The processor copies the SPSR.SS bit to a current step number bit CPSR.SS in the current status register CPSR in response to this request.

Thus, in response to these bits being set the processor processes a single instruction and sets the CPSR.SS bit to 0 to indicate it has executed the one instruction and then takes a diagnostic exception. Processor 20 copies the step number bit from the current status register CPSR.SS to the saved status register SPSR.SS as part of taking the diagnostic exception.

Processor 20 also writes further information about the diagnostic exception to a further status register ESR in register bank 30, which is used to record information about exceptions, including diagnostic exceptions.

Processor 20 executes exception handler code followed by diagnostic code and the current state of the processor is analysed. The step number bit SPSR.SS in the SPSR register is set to 1 to indicate that a next instruction in the instruction stream should now be executed. When the single step diagnostic mode is to be exited the control bits MDSCR.SS and SPSR.SS in registers SPSR and MDSCR in register bank 30 are reset.

If multiple hierarchical processing states, or exception levels, are implemented then each exception level has its own SPSR and ESR registers, SPSR_EL1 and ESR_EL1 for exception level 1, SPSR_EL2 and ESR_EL2 for exception level 2, etc.

Figure 3:
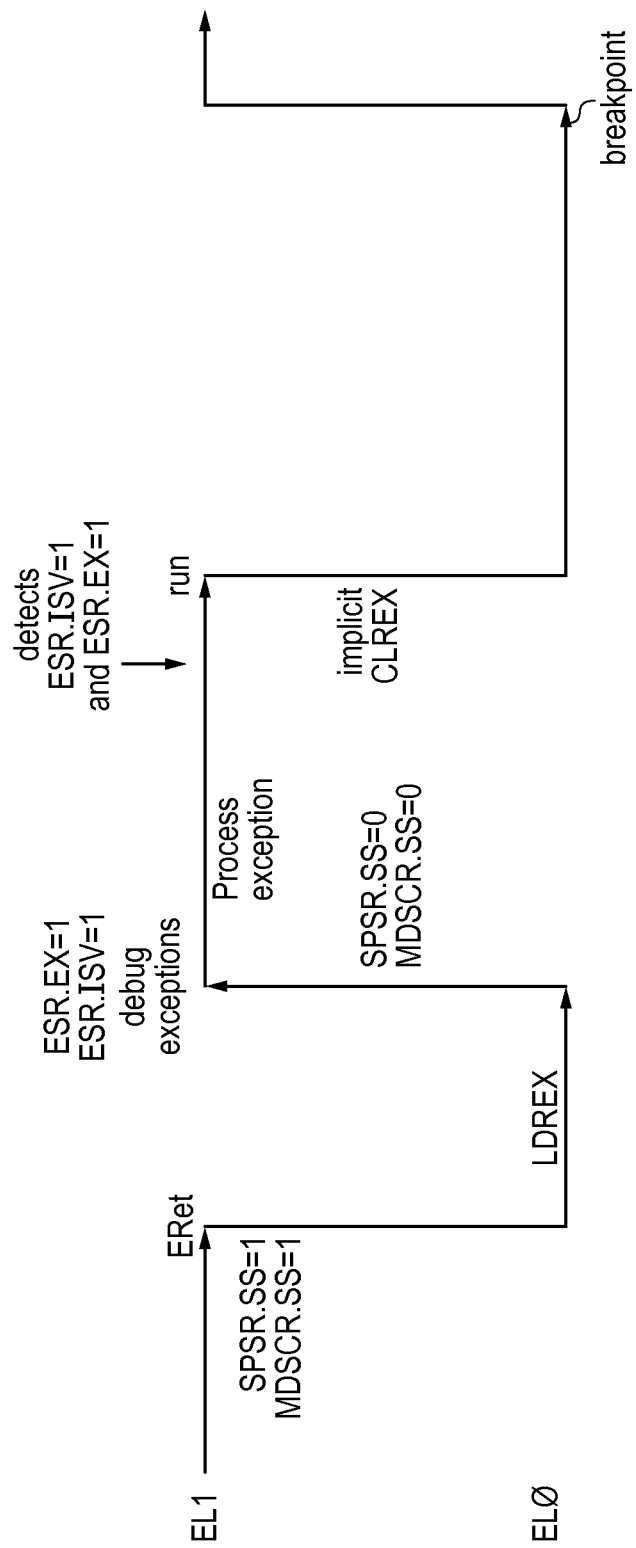
FIG. 3 shows the processing of an exclusive load instruction within an instruction stream executing in single step diagnostic mode according to an embodiment of the present invention.

FIG. 3 shows how instruction code including an exclusive load instruction LDREX is executed in single step diagnostic mode according to an embodiment of the present invention. In this figure time flows from left to right. Thus, the SPSR.SS bit and the MDSCR.SS bit are set to one indicating single step mode of operation, an exception return ERET instruction is executed to jump into the software being debugged. This copies SPSR.SS to CPSR.SS and so a single instruction from the software being debugged is executed. This instruction is an exclusive load instruction LDREX instruction and in response to the exclusive load instruction LDREX being executed, the CPSR.SS bit is set to 0 indicating that no further instruction should be executed before a diagnostic exception is taken.

The diagnostic exception is taken, CPSR.SS is copied to SPSR.SS, and a syndrome bit ESR.EX within a status register is set to 1 to indicate the exclusive load instruction LDREX was executed. A valid bit ESR.ISV within this register is also set which indicates that this is a valid value for this bit.

These syndrome and corresponding valid bits are set in embodiments of the invention whenever instructions of a particular type are executed. These may be types of instructions that exclusively claim the monitor which then indicates that they have exclusive access to a particular storage location, such as an exclusive load instruction. They may also be other types of instructions where execution of subsequent instructions within the instruction stream may be altered by an exception handler executing.

When an LDREX instruction accesses a first location the monitor bit records that this first location was accessed. The monitor has two states: "Open access" and "Exclusive access". LDREX claims access to the first location by putting the monitor into the "Exclusive access" state, and the monitor keeps a record of the accessed address, in the form of an address tag.

The monitor and its tag are checked on a store exclusive STREX instruction. The STREX instruction is a store instruction requesting a value is written to a second location. The STREX instruction only allows the write to proceed if the monitor is in the "Exclusive access" state and the STREX is writing to the tagged address, that is, the second location matches the first location. The monitor is forced back to "Open access" by the STREX itself; but also by a clear exclusive CLREX instruction, or possibly some other instruction accessing the tagged address. To avoid possible software malfunction due to an exception handler causing a change in software context between the LDREX and STREX instruction, the exclusive monitor is also forced back to "Open access" by an exception return. This may be done by software convention, for example, by always executing a CLREX instruction before an ERET, or may be enforced by the hardware forcing the monitor back to the "Open access" state on executing an ERET instruction.

For a global monitor in a multiprocessor system, the STREX only allows the write if the access is also coming from the same processor that issued the LDREX. The monitor may also be cleared to the "Open access" state by other instructions accessing other locations, such as those close to the tagged address.

Thus, in this embodiment following execution of the single LDREX instruction and in response to the MDSCR.SS control bit being set indicating single step mode, a diagnostic exception is taken and the ESR.EX and the ESR.ISV bits are set and the diagnostic code is then executed. The diagnostic code detects that the ESR.ISV valid bit and the corresponding ESR.EX syndrome bit are set and as these indicate that the previous instruction was one of the predetermined type where single step mode is not appropriate it instructs the processor to clear the MDSCR.SS and SPSR.SS bits such that on return from the exception handler the single step mode is exited and normal execution of the instruction stream occurs.

The diagnostic code will also set a suitable breakpoint indicating a point in the instruction stream, and this allows the diagnostic circuitry to break normal execution at this point and, as necessary, restart single step mode.

The processor then executes the next portion of the instruction stream until the breakpoint is reached. This breakpoint will have been set at a position in the code that is after the block of code whose execution is altered by exceptions occurring between instructions.

The code that is to be executed may for example be code trying to gain exclusive access to a semaphore variable:

```
Loop
    LDREX     R5, [R1]       ; read lock (load-exclusive)
    CMP       R5, #0         ; check if 0
    STREXEQ   R5, R0, [R1]   ; attempt to store new value
    CMPEQ     R5, #0         ; test if store succeeded
    BNE       Loop           ; retry if not
```

In this example, the code loops until it acquires the semaphore. It will then exit the loop successfully and hence a breakpoint can be put after this section of code which allows a return to single step mode.

In other code, the software may want to do something else if it doesn't acquire the semaphore. Code may be written in this way to allow for the case where another process may have acquired the semaphore so it may take some time to be available. This is a different type of code:

```
Loop
    LDREX     R5, [R1]       ; read lock (load-exclusive)
    CMP       R5, #0         ; check if 0 (semaphore is free)
    BNE       SomethingElse  ; if not, do something else
    STREX     R5, R0, [R1]   ; attempt to store new value
    CMP       R5, #0         ; test if store succeeded
    BNE       Loop           ; retry if not
```

Note that the code loops if the STREX fails because STREX fail doesn't necessarily imply the semaphore has been taken by another process, so it is worthwhile trying again.

In this case, having stepped the LDREX the debugger finds two exit points for the loop, one at the end of this segment of code and one at the label "SomethingElse" (not shown). So the debugger has to set breakpoints on them both.

In the above embodiment, the processor resumed normal execution and continued to execute code from after the exclusive load instruction. In other embodiments, the diagnostic code may control the processor to re-execute the load exclusive instruction if this is appropriate or it may itself emulate the section of code that should not be executed in single step mode and then control the processor to start execution of the code after this section of code, in this case after the store exclusive instruction.

If the diagnostic code was not configured to control the processor to exit the single step diagnostic mode in response to the valid bit ESR.ISV and the syndrome bit ESR.EX being set, then on return from the diagnostic exception the exception handler would clear the exclusive monitor and the code would not make forward progress.

Figure 4:
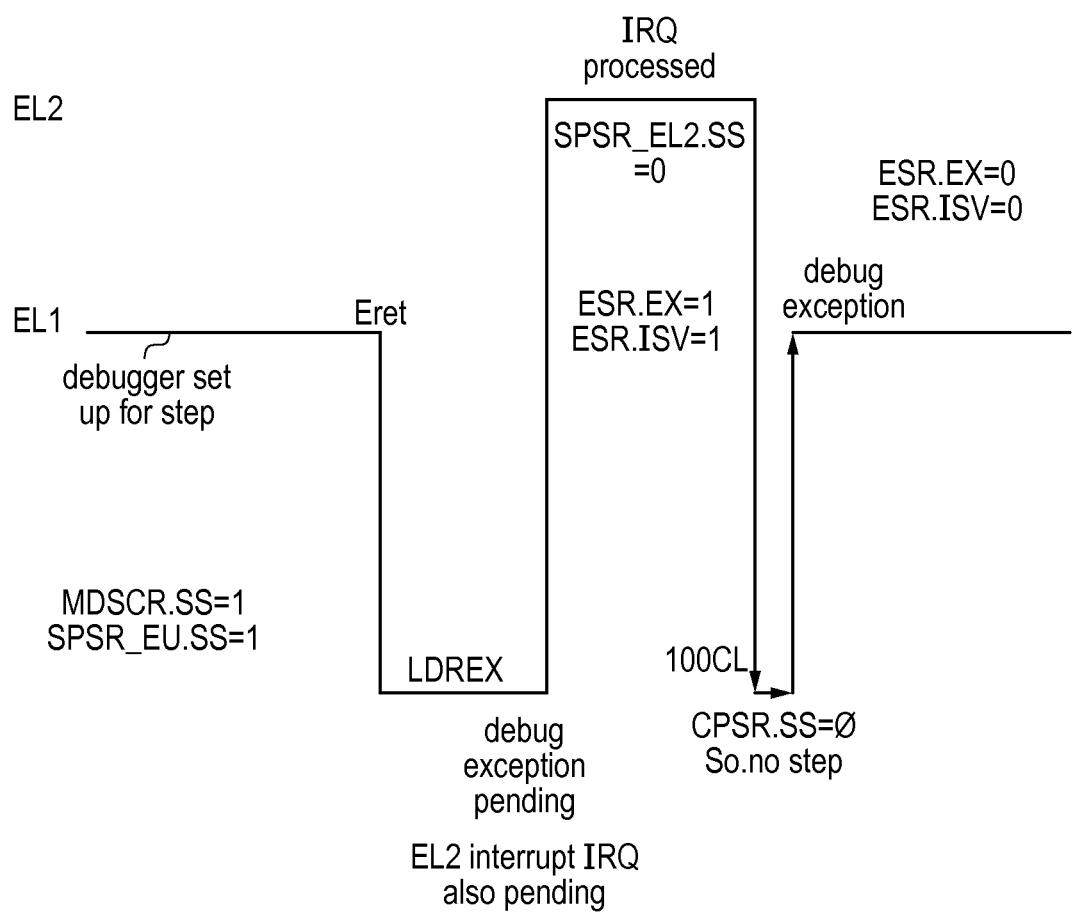
FIG. 4 shows the processing of an instructions stream in single step diagnostic mode where an interrupt occurs after the exclusive load instruction.

FIG. 4 shows an embodiment where a high priority interrupt is pending after a load exclusive instruction has executed in single step mode (MDSCR.SS=1). In this embodiment there are multiple exception levels. The diagnostic code is executing at EL1, and to indicate that a single instruction is to be executed in single step mode sets the saved step number bit in its saved status register, SPSR_EL1.SS to one. It executes an ERET instruction, as in FIG. 3, which copies SPSR_EL1.SS to CPSR.SS. After the load exclusive instruction is executed, CPSR.SS is cleared to 0. Thus, when the interrupt is taken at exception level 2 EL2 in preference to the diagnostic exception that is also pending, the processor sets the saved step number bit for EL2 SPSR_EL2.SS bit to 0. When the interrupt has been processed, an instruction for returning from the interrupt is executed. This clears the exclusive monitor (as is generally done on return from an exception) and copies SPSR_EL2.SS to CPSR.SS. As the step number bit CPSR.SS is now set to 0, a diagnostic exception is generated without executing any instruction. As no instruction was executed the processor 20 sets the valid bit associated with the exclusive monitor ESR.ISV to zero, indicating that the type of instruction that has previously been executed and might have claimed the exclusive monitor is unknown.

In response to detecting the ESR.ISV being zero the debug code needs to determine what the previously executed instruction was and thus, it requests the code for this instruction from the processor. Although there is some overhead associated with such a request, this request is only required in circumstances where an exception has occurred after an instruction has executed in single step mode, thus, it is very different from requiring each instruction to be requested.

Figure 5:
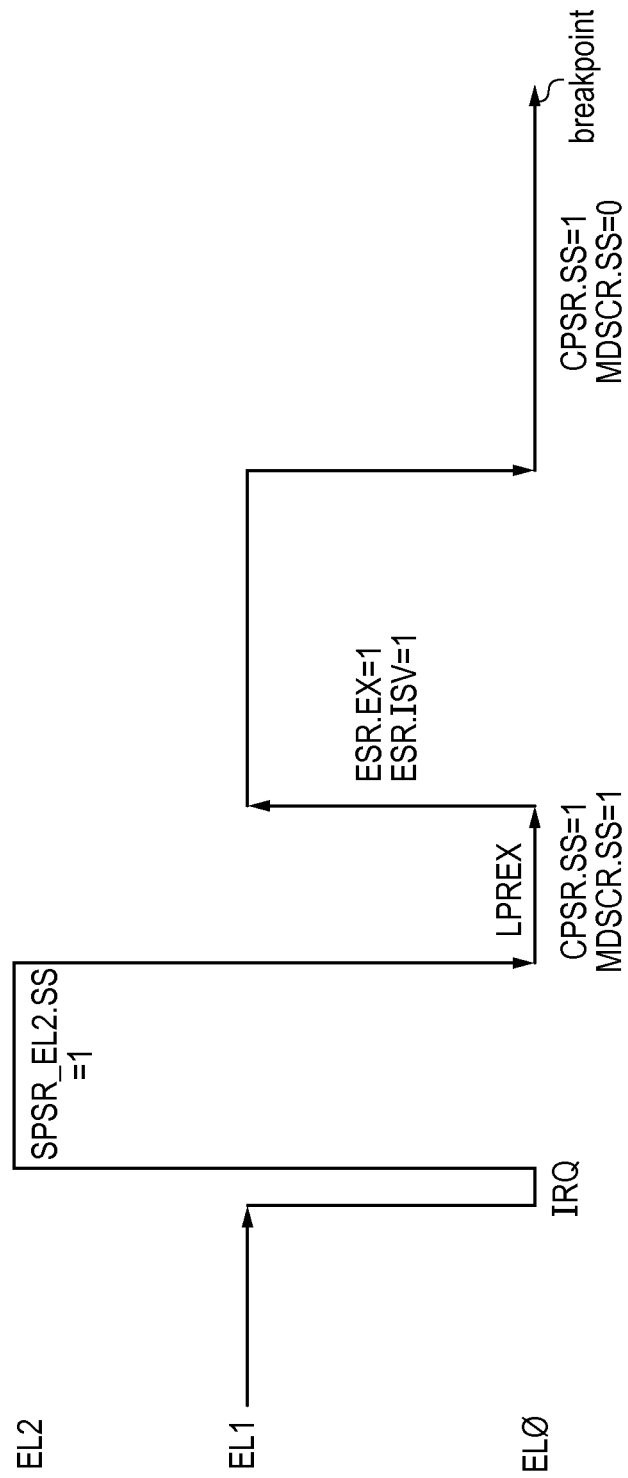
FIG. 5 shows the processing of an instructions stream in single step diagnostic mode where an interrupt occurs prior to execution of an exclusive load instruction.

FIG. 5 shows what happens when an EL2 priority interrupt is received immediately before the instruction is single stepped. In this case the step number indicator CPSR.SS is set to one when the interrupt is taken, so SPSR_EL2.SS is set to one and thus, on return from this exception the next instruction, the load exclusive is executed and then a diagnostic exception is taken. As the instruction that was executed was an exclusive load instruction the processor 20 sets the ESR.EX bit and ESR.ISV bit and thus, the diagnostic code clears the SPSR_EL1.SS and MDSCR.SS values in response to this and controls the processor to enter normal operating mode having first set one or more breakpoints.

In summary if a software step diagnostic exception is generated immediately following the instruction step, the valid bit ESR.ISV is set to one, if the software step debug exception is generated without having just executed the instruction then the valid bit ESR.ISV is set to 0.

Figure 6:
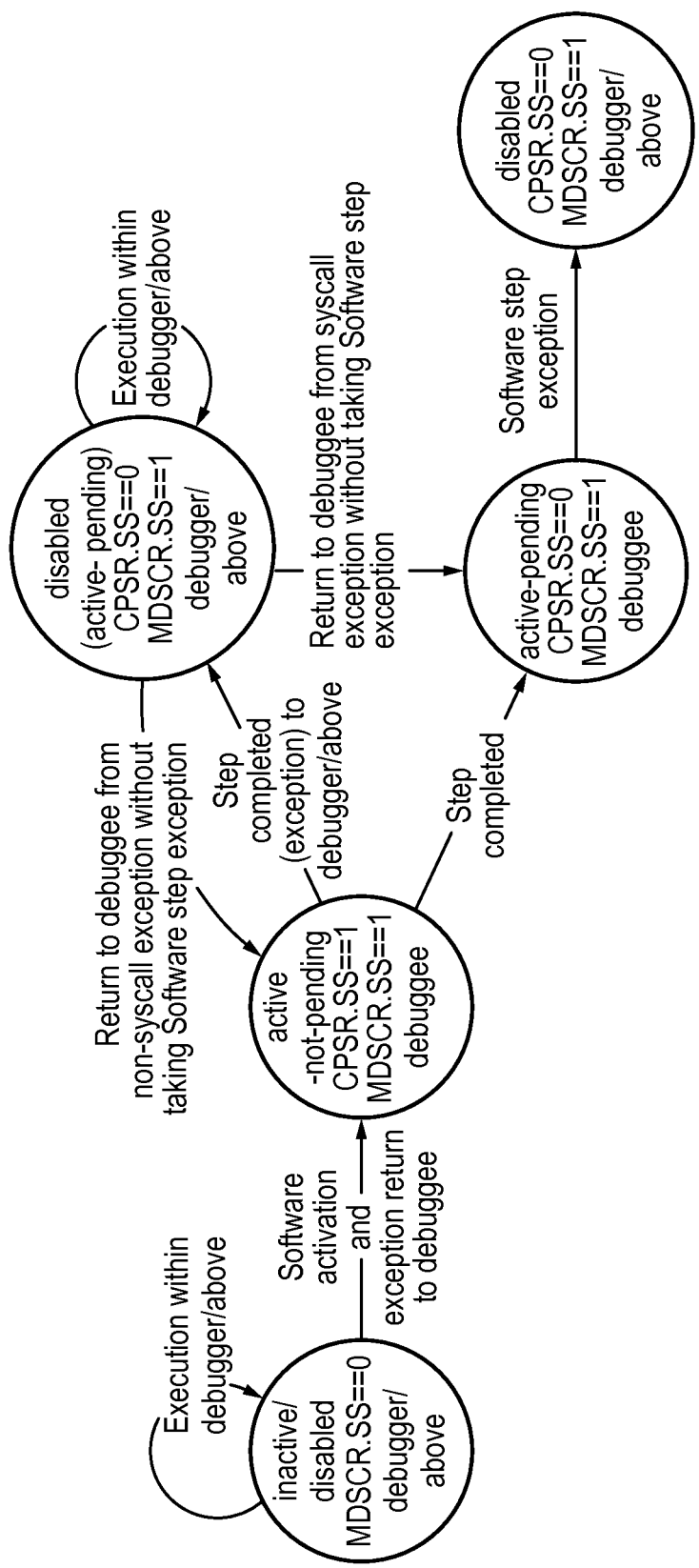
FIG. 6 shows the possible states of a processor operating in the single step diagnostic mode.

FIG. 6 shows the possible states of a processor in software step mode.

If the MDSCR.SS bit is not set, then the processor is not executing in single step mode. Thus, initially the software step state of the processor is inactive and disabled and the debugger executes diagnostic software. The MDSCR.SS bit and SPSR.SS bit are then set to indicate that the step mode is to be entered on executing an exception return from the debugger. On said exception return the processor enters an active-not-pending state in which a single instruction can be executed (that is, software step is active, but at this point no diagnostic exception is pending). The processor is in this state if executing the debuggee code and the MDSCR.SS bit is set indicating single step mode and the CPSR.SS bit is set indicating one instruction is to be executed.

The processor may exit this state either by executing the single instruction or by an exception being taken. If it executes the instruction then the CPSR.SS is reset to zero indicating the single step has completed. At this stage the software step diagnostic exception is now pending, so the software step state is active-pending.

The processor may also exit this state by taking an exception other than the software step diagnostic exception, whereupon, if this exception is of higher priority than a diagnostic exception the software step state is disabled while it is handled. Depending on the type of exception, and whether it occurs before or after the instruction is executed, the SPSR.SS bit is either 1 or 0 on taking the exception, and so on return from the exception handler the processor returns to either the active-not-pending or the active-pending state.

If, however, the other exception is of lower priority than a diagnostic exception, the CPSR.SS bit is reset to zero indicating the single step has completed. At this stage the software step diagnostic exception is now pending, so the software step state is active-pending.

From the active-pending state the software step diagnostic exception is taken, copying CPSR.SS to SPSR.SS. Execution reverts to the debugger and the software step state is disabled. The MDSCR.SS bit is still set indicating single step mode and the SPSR.SS bit is clear indicating the step has executed.

FIG. 7a shows a flow diagram illustrating steps in a method according to an embodiment of the present invention. The method starts by the diagnostic apparatus entering single step diagnostic mode by setting the single step bit in a control register and setting a step number to one.

The method then proceeds (via the connection labelled "A") by returning to the code being stepped.

As initially the step number is one, then, if there are no exceptions pending a single instruction is executed. Assuming this instruction generates no exceptions, the step number is set to zero and, if no other exceptions are pending, the apparatus also determines if the instruction was of a predetermined type, this type being the type where taking an exception after execution of the instruction will affect how the following instructions execute. If it is then the type and valid bits are set in a status register, if not the valid bit is set and the type bit is cleared. A diagnostic exception is now taken, and the method continues (via connection labelled "B").

Assuming the method is not complete (the details of how this is determined are not shown), the diagnostic apparatus determines that the diagnostic exception was due to a software step, and, if it is, it is further determined if the valid and type bits are set. If the valid bit is set and the type bit clear, then the method returns to set the step number to one (the single step control bit is still set) and continues by stepping the next instruction. Note that this is the most common path through the method, and also the optimal path.

However, if both the valid and type bits are set then this is an indication that the single step mode should be suppressed and the single step bit is cleared and breakpoint(s) are set at suitable point(s) in the code where the single step mode can be restarted.

Similarly, if the valid bit was determined not to be set on taking the diagnostic exception then the method performs a direct test of the instruction that was stepped to see if it was one of the predetermined type(s). Based on this test, the method determines whether to proceed with the single step mode, or set breakpoint(s). The method again proceeds (via the connection "A") by returning to the code being stepped.

In the case where breakpoint(s) have been used, however, the single step control bit is not set so the instructions are executed as a stream of instructions until a breakpoint is reached and a diagnostic exception is taken. Because it is later determined that the diagnostic exception was due to a breakpoint, the breakpoint(s) are removed and the single step control bit is set and the step number is set to one and so the single step mode recommences.

It should be noted that interrupts and other exceptions may occur and be taken during the execution of the stream of instructions in the normal way.

If at any time during executing instruction(s) from the code being debugged, a non-diagnostic exception is pending then it would be taken. For exceptions taken before the instruction is executed, and for exceptions other than system call (syscall) exceptions generated by the instruction being executed (such as memory management faults), the step number is unchanged (one) before taking the exception. In these cases the exception effectively cancels the instruction, meaning that if it was being stepped, it should be stepped again.

Thus, on taking the exception, the step number is recorded in the SPSR for the exception handler. The step number is then set to zero.

It should be further noted that the non-diagnostic exception may have a priority which is lower than that of a diagnostic exception. If this is the case the software step control bit is effective during processing of the non-diagnostic exception, and, because the step number is now zero, a diagnostic exception will be taken immediately. As no instruction is executed, both the valid and type bits are cleared.

For high priority interrupts taken after the instruction and syscall exceptions generated by the instruction, the instruction is effectively complete, and so the step number is set to zero before taking the exception. Only interrupts with a higher priority than the diagnostic exception and syscall exceptions can be taken at this point.

Otherwise, on return from the exception if the single step control bit is set the step number is restored from the SPSR and evaluated. If it is one then this indicates that the exception was taken before the instruction in the step mode completed and so on return from the exception the instruction in the stream is re-executed.

If it is zero then this indicates that the exception was taken after execution of the instruction in the step mode was completed but before the taking of the diagnostic exception associated with that instruction. In this case, assuming no higher priority exception is pending, a diagnostic exception is taken immediately. However, the valid bit and the associated type bit must be cleared to indicate that the value indicating the type of instruction cannot be determined as other instructions will have been executed in the meantime.

Thus on taking the diagnostic exception (via "B"), it will be determined that the valid bit is clear and the method performs a direct test of the instruction that was stepped to see if it was one of the predetermined type(s). Based on this test, the method determines whether to proceed with the single step mode, or set breakpoint(s).

The method again proceeds (via "A") by returning to the code being stepped, as described above.

FIG. 7b shows a flow diagram illustrating steps in a method according to a further embodiment of the present invention. This method is generally used for the "external debug" case where the debugger is on an external apparatus such as is shown in FIG. 1. In this case the indicator value indicates the reason for the diagnostic exception which may be that the program is stepping, in which case the indicator value will indicate the type of instruction or it may be another reason for the debug event/diagnostic exception. Thus, this indicator value has a plurality of possible values, including: stepped instruction not of the predetermined type, stepped instruction of the predetermined type, stepped instruction of an unknown type; the values for the three types might be: 0110, 0111, and 1110. Other values are used to indicate other reasons for the debug event/diagnostic exception, such as breakpoint taken, halt request, etc. These possible values are shown in the table of FIG. 7c. Only the step and breakpoint values are considered in the flow diagram of FIG. 7b, as these are the only event types that can occur in the method.

Thus, as in FIG. 7a, the method starts by the diagnostic apparatus entering single step diagnostic mode by setting the single step bit in a control register and setting a step number to one.

The method then proceeds (via the connection labelled "A") by returning to the code being stepped.

As initially the step number is one, if there are no exceptions pending a single instruction is executed. Assuming this instruction generates no exceptions, the step number is set to zero and, if no other exceptions are pending, the apparatus also determines if the instruction was of a predetermined type, this type being the type where taking an exception after execution of the instruction will affect how the following instructions execute. If it is then the indication of type is set to STEPexcl in a status register, if it is not one of the predetermined type then the indication of type is set to STEPok. A diagnostic exception is now taken, and the method continues (via connection labelled "B").

Assuming the method is not complete (the details of how this is determined are not shown), the diagnostic apparatus determines what the indication of type is set to. If it was set to STEPok indicating that the instruction was not one of the predetermined type then the method returns to set the step number to one (the single step control bit is still set) and continues by stepping the next instruction. Note that this is the most common path through the method, and also the optimal path.

If the indication of type is set to STEPunknown indicating that the type of instruction is unknown then the method performs a direct test of the instruction that was stepped to see if it was one of the predetermined type(s). Based on this test, the method determines whether to proceed with the single step mode, or set breakpoint(s). The method again proceeds (via the connection "A") by returning to the code being stepped.

If the indication of type is set to STEPexcl indicating that the instruction stepped was of the predetermined type then this is an indication that the single step mode should be suppressed and the single step control bit is cleared and breakpoint(s) are set at suitable point(s) in the code where the single step mode can be restarted.

In the case where breakpoint(s) have been used, the single step control bit is not set so the instructions are executed as a stream of instructions until a breakpoint is reached. At this point the indication type is set to BRK as the diagnostic exception is due to a breakpoint and the diagnostic exception is taken. Later, in response to the indication of type being BRK the breakpoint(s) are removed and the single step control bit is set and the step number is set to one and so the single step mode recommences.

It should be noted that interrupts and other exceptions may occur and be taken during the execution of the stream of instructions in the normal way.

If at any time during executing instruction(s) from the code being debugged, a non-diagnostic exception is pending then it would be taken. For exceptions taken before the instruction is executed, and for exceptions other than system call (syscall) exceptions generated by the instruction being executed (such as memory management faults), the step number is unchanged (one) before taking the exception. In these cases the exception effectively cancels the instruction, meaning that if it was being stepped, it should be stepped again.

The step number is recorded in the SPSR for the exception handler. The step number is then set to zero.

It should be further noted that the non-diagnostic exception may have a priority which is lower than that of a diagnostic exception. If this is the case the software step control bit is effective during processing of the non-diagnostic exception, and, because the step number is now zero, a diagnostic exception will be taken immediately. As no instruction is executed, the indication of type is set to STEPunknown (not shown).

For high priority interrupts taken after the instruction and syscall exceptions generated by the instruction, the instruction is effectively complete, and so the step number is set to zero before taking the exception. Only interrupts with a higher priority than the diagnostic exception and syscall exceptions can be taken at this point.

Otherwise, on return from the exception if the single-step control bit is set the step number is restored from the SPSR and evaluated. If it is one then this indicates that the exception was taken before the instruction in the step mode completed and so on return from the exception the instruction in the stream is re-executed.

If it is zero then this indicates that the exception was taken after execution of the instruction in the step mode was completed but before the taking of the diagnostic exception associated with that instruction. In this case, assuming no higher priority exception is pending, a diagnostic exception is taken immediately and the indication of type is set to STEPunknown prior to the taking of the diagnostic exception to indicate that the type of instruction cannot be determined as other instructions will have been executed in the meantime.

Thus on taking the diagnostic exception (via "B"), it will be determined that the indication type is STEPunknown and the method performs a direct test of the instruction that was stepped to see if it was one of the predetermined type(s). Based on this test, the method determines whether to proceed with the single step mode, or set breakpoint(s).

Figure 8:
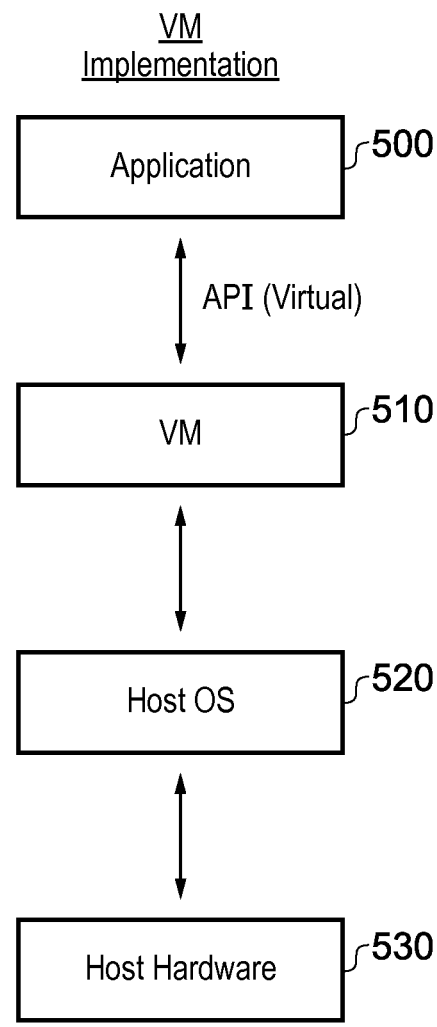
FIG. 8 shows a virtual machine implementation of an embodiment of the present invention.

FIG. 8 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 is capable of executing an application program (or operating system) 500 to give the same results as would be given by execution of the program by such a real hardware device. Thus, the diagnostic stepping of program instructions, including the control of entry and exit to this mode of operation, may be executed from within the application program 500 using the virtual machine program 510.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for diagnosing a processor processing a stream of instructions comprising:
   (i) controlling said processor to execute in a single step mode such that a single instruction from said instruction stream is executed, said processor determines if said single instruction is one of at least one predetermined type of instruction and stores a type indicator in a data storage location and a diagnostic exception is taken after said processor has processed said single instruction;
   (ii) performing diagnostic operations following said diagnostic exception including: accessing said type indicator stored in said data storage location; and
   (iiia) in response to said type indicator indicating said single instruction was not one of said predetermined type controlling said processor to continue executing instructions in said single step mode such that a next single instruction is executed on return from said diagnostic exception;
   (iiib) in response to said type indicator indicating said single instruction was one of said at least one predetermined type controlling said processor to exit said single step mode and not execute said next instruction within said instruction stream as a single instruction followed by a diagnostic exception.

2. A method according to claim 1, wherein said step (iiib) comprises controlling said processor to execute a plurality of instructions within said instruction stream on return from said diagnostic exception.

3. A method according to claim 2, wherein said plurality of instructions comprises a plurality of instructions subsequent in said instruction stream to said executed single instruction.

4. A method according to claim 2, wherein said plurality of instructions comprises a plurality of instructions subsequent in said instruction stream to and including said executed single instruction.

5. A method according claim 2, comprising a further step of in response to said type indicator indicating said single instruction was one of said at least one predetermined type of setting at least one breakpoint within said instruction stream, such that said plurality of instructions are executed until said at least one breakpoint is reached, provided no other exceptions are received during execution of said plurality of instructions, and taking a diagnostic breakpoint exception in response to reaching said at least one breakpoint.

6. A method according to claim 1, wherein said step (iiib) comprises emulating said executed single instruction and at least one subsequent instruction in said instruction stream and then controlling said processor to commence said single step mode from an instruction in said instruction stream following said at least one subsequent instruction that was emulated.

7. A method according claim 1, wherein said type indicator stored in said data storage location indicates that said instruction was one of said predetermined type or said instruction was not one of said predetermined type or that said instruction is of an unknown type, wherein if in said step of accessing said type indicator it is determined that said type indicator indicates that said instruction is of an unknown type an additional step of examining said single instruction and determining if said single instruction is of said predetermined type is performed.

8. A method according to claim 7, wherein said type indicator comprises two indicator values, a first value indicating whether said instruction is of said predetermined type or not of said predetermined type and a second valid value indicating if said first value is valid, said second valid value being invalid indicating said instruction is of said unknown type.

9. A method according to claim 7, wherein said type indicator further comprises an indication of a type of diagnostic exception taken.

10. A method according to claim 1, wherein said method comprises an initial step of setting a single instruction step control value indicating said single instruction step diagnostic method is to be performed and setting a step indicator value indicating a single instruction in said instruction stream is to be executed before a next diagnostic exception is to be taken.

11. A method according to claim 10, wherein said type indicator stored in said data storage location indicates that said instruction was one of said predetermined type or said instruction was not one of said predetermined type or that said instruction is of an unknown type, wherein if in said step of accessing said type indicator it is determined that said type indicator indicates that said instruction is of an unknown type an additional step of examining said single instruction and determining if said single instruction is of said predetermined type is performed; wherein said type indicator further comprises an indication of a type of diagnostic exception taken; wherein in response to said step indicator value indicating zero instructions are to be executed before taking a next diagnostic exception, said type indicator is set to unknown type on taking said diagnostic exception.

12. A method according to claim 10 wherein if in said step of accessing said type indicator it is determined that said type indicator indicates that said instruction is of an unknown type an additional step of examining said single instruction and determining if said single instruction is of said predetermined type is performed; wherein said type indicator further comprises an indication of a type of diagnostic exception taken; wherein in response to said processor flushing state before taking of said next diagnostic exception said type indicator is set to indicate said executed instruction is of said unknown type.

13. A method according to claim 1, wherein said predetermined type comprises a type of instruction where operations performed by an exception handler on entry to or return from an exception change a state of an apparatus comprising said processor such that at least one subsequent instruction in said instruction stream may execute differently.

14. A method according to claim 13, wherein one of said at least one predetermined type of instruction comprises an instruction that accesses a lock location, said lock location storing one of a lock value and a clear value, said clear value indicating that a processor can write to a predetermined storage location and said lock value indicating exclusive write access to said predetermined storage location for a processor that stored said lock value.

15. A non-transitory computer readable medium for storing a computer program which when executed by a data processing apparatus controls said data processing apparatus to performs steps in a method according to claim 1.

16. A diagnostic apparatus for analysing a processor processing an instruction stream, said diagnostic apparatus comprising:
an output for outputting control signals to said processor and an input for receiving data from said processor; and
diagnostic circuitry for performing diagnostic operations;
said diagnostic circuitry being configured to output a control signal to said processor to set an indicator value indicating said processor is to operate in single step mode such that a single instruction in said instruction stream is executed and then a diagnostic exception is taken; and
said diagnostic circuitry being configured to access a storage location for storing a type indicator indicating whether said executed single instruction was one of at least one predetermined type of instruction; and
in response to said type indicator indicating said executed single instruction was not one of said predetermined type said diagnostic circuitry is configured to control said processor to continue executing instructions in said single step mode such that a next single instruction is executed on return from said diagnostic exception; and
in response to said type indicator indicating said executed single instruction was one of said at least one predetermined type said diagnostic circuitry is configured to control said processor to exit said single step mode and not execute said next instruction within said instruction stream as a single instruction followed by a diagnostic exception.

17. A diagnostic apparatus according to claim 16, wherein in response to said type indicator indicating said executed single instruction was one of said at least one predetermined type said diagnostic circuitry is configured to control said processor to execute a plurality of instructions within said instruction stream on return from said diagnostic exception.

18. A diagnostic apparatus according to claim 17, wherein said plurality of instructions comprises a plurality of instructions subsequent in said instruction stream to said executed single instruction.

19. A diagnostic apparatus according to claim 17, wherein said plurality of instructions comprises a plurality of instructions subsequent in said instruction stream to and including said executed single instruction.

20. A diagnostic apparatus according to claim 17, said diagnostic circuitry being configured in response to said type indicator indicating said executed instruction was one of said at least one predetermined type to set a breakpoint within said instruction stream after said plurality of instructions.

21. A diagnostic apparatus according to claim 16, wherein said diagnostic circuitry is configured to emulate said executed single instruction and at least one subsequent instruction in said instruction stream and to issue a control signal to said processor to commence said single step mode from an instruction following said at least one subsequent instruction that was emulated.

22. A diagnostic apparatus according to claim 16, wherein said type indicator comprises two indicator values, a first value indicating said predetermined type or not said predetermined type and a second valid value indicating if said first value is valid, said second valid value being invalid indicating said instruction is of said unknown type.

23. A diagnostic apparatus according to claim 16, wherein said type indicator further comprises an indication of a type of diagnostic exception taken.

24. A data processing apparatus comprising a processor for processing a stream of instructions and a diagnostic apparatus according to claim 16 for analysing said processor.

25. A data processing apparatus according to claim 24, comprising a storage location for storing said type indicator, said processor being configured in response to executing said single instruction from said instruction stream to determine if said single instruction is one of at least one predetermined type and to store a type indicator indicating whether said single instruction is of said predetermined type of not.

26. A data processing apparatus according to claim 24, said processor being configured in response to taking an exception other than said diagnostic exception after execution of one of said single instructions to set said type indicator to indicate said executed instruction is of an unknown type.

27. A data processing apparatus according to claim 24, wherein one of said at least one predetermined type of instruction comprises an instruction that accesses a lock location, said lock location storing one of a lock value and a clear value, said clear value indicating that a processor can write to a predetermined storage location and said lock value indicating exclusive write access to said predetermined storage location for a processor that stored said lock value.

28. A data processing apparatus comprising a processor executing a virtual machine provided by a computer program, said virtual machine providing an instruction execution environment according to the data processing apparatus as claimed in claim 24.

* * * * *